United States Patent
Manoonpong et al.

(10) Patent No.: US 12,509,171 B2
(45) Date of Patent: Dec. 30, 2025

(54) METHOD AND SYSTEM FOR CONTROLLING MOTION OF A MULTI-SEGMENTED WALKING ROBOT

(71) Applicant: PTT EXPLORATION AND PRODUCTION PUBLIC COMPANY LIMITED, Bangkok (TH)

(72) Inventors: Poramate Manoonpong, Rayong (TH); Jettanan Homchanthanakul, Rayong (TH); Binggwong Leung, Rayong (TH); Thirawat Chuthong, Rayong (TH); Suppachai Pewkliang, Bangkok (TH)

(73) Assignee: PTT EXPLORATION AND PRODUCTION PUBLIC COMPANY LIMITED, Bangkok (TH)

( * ) Notice: Subject to any disclaimer, the term of this patent is extended or adjusted under 35 U.S.C. 154(b) by 72 days.

(21) Appl. No.: 18/690,652

(22) PCT Filed: Sep. 8, 2021

(86) PCT No.: PCT/IB2021/058152
§ 371 (c)(1),
(2) Date: Mar. 8, 2024

(87) PCT Pub. No.: WO2023/037139
PCT Pub. Date: Mar. 16, 2023

(65) Prior Publication Data
US 2025/0145232 A1 May 8, 2025

(51) Int. Cl.
*B25J 9/16* (2006.01)
*B25J 13/08* (2006.01)
*B62D 57/032* (2006.01)

(52) U.S. Cl.
CPC .......... *B62D 57/032* (2013.01); *B25J 9/1664* (2013.01); *B25J 9/1674* (2013.01); *B25J 13/081* (2013.01); *B25J 13/085* (2013.01)

(58) Field of Classification Search
None
See application file for complete search history.

(56) References Cited

U.S. PATENT DOCUMENTS 6,532,400 B1 * 3/2003 Jacobs .................... F15B 11/20
                                                  318/568.17
6,636,781 B1 10/2003 Shen et al.
(Continued)

OTHER PUBLICATIONS

Zhang et al., Adaptive Walking Control for Quadruped Robot with CPG Network using Motor Dynamics, 2014, IEEE, p. 2428-2430 (Year: 2014).*

(Continued)

*Primary Examiner* — McDieunel Marc
(74) *Attorney, Agent, or Firm* — Womble Bond Dickinson (US) LLP

(57) ABSTRACT

A method for controlling motion of a multi-segmented walking robot comprising the steps of: (A) generating walking pattern signals using a central pattern generator (CPG); (B) sending the generated walking pattern signals to a controller to generate motor commands to drive a plurality of joint motors of each leg of robot; (C) detecting motion feedback signals using a plurality of sensors; (D) processing the detected motion feedback signals to recognize the motion of robot; and (E) adapting the motion of robot, by a controller, based on the recognized motion of robot. Another aspect relates to a system for controlling motion of a multi-segmented walking robot comprising: a central pattern generator (CPG); a controller; a plurality of sensors; an artificial hormone system processing unit; and a torque processing unit.

17 Claims, 2 Drawing Sheets

(56) References Cited

U.S. PATENT DOCUMENTS

| | | | | |
|---|---|---|---|---|
| 7,668,665 | B2* | 2/2010 | Kim | G01H 9/004 702/33 |
| 8,630,763 | B2* | 1/2014 | Goulding | B25J 9/1633 700/258 |
| 8,706,298 | B2* | 4/2014 | Goulding | G06N 3/008 700/251 |
| 2004/0172165 | A1 | 9/2004 | Iribe et al. | |
| 2005/0038560 | A1 | 2/2005 | Nagasaka | |
| 2012/0155775 | A1 | 6/2012 | Ahn et al. | |
| 2025/0136206 | A1* | 5/2025 | Kojouharov | B62D 57/032 |

OTHER PUBLICATIONS

Fang et al., A Robotic Exoskeleton for Lower Limb Rehabilitation Controlled by Central Pattern Generator, 2014, IEEE, p. 814-818 (Year: 2014).*

Eich et al., Proprioceptive Control of a Hybrid Legged-Wheeled Robot , 2008, IEEE, p. 774-779 (Year: 2008).*

Batres-Mendoza et al., Biologically-Inspired Legged Robot Locomotion Controlled With a BCI by Means of Cognitive Monitoring, 2021, IEEE, p. 35766-35777 (Year: 2021).*

Potiwat Ngamkajornwiwat et al., "Bio-Inspired Adaptive Locomotion Control System for Online Adaptation of a Walking Robot on Complex Terrains", IEEE Access, vol. 8, May 6, 2020, pp. 91587-91602.

Potiwat Ngamkajornwiwat et al., "Online Gait Adaptation of a Hexapod Robot Using an Improved Artificial Hormone Mechanism", 15th International Conference on Simulation of Adaptive Behavior, SAB 2018, Germany, 11 pp. 1-11.

David Rollison et al., "Torque Control Strategies for Snake Robots", 2014 IEEE/RSJ International Conference on Intelligent Robots and Systems (IROS 2014) Sep. 14-18, 2014, Chicago, IL, USA, pp. 1093-1099.

International Search Report and Written Opinion Dated Nov. 24, 2021 for International Application No. PCT/IB2021/058152, 9 pages total.

* cited by examiner

METHOD AND SYSTEM FOR CONTROLLING MOTION OF A MULTI-SEGMENTED WALKING ROBOT

CROSS-REFERENCE TO RELATED APPLICATIONS

This application is a national stage of International Application No. PCT/IB2021/058152, filed on Sep. 8, 2021, the disclosure of which is incorporated herein by reference in its entirety.

FIELD OF THE INVENTION

An engineering in the field of a method and system for controlling motion of a multi-segmented walking robot.

BACKGROUND OF THE INVENTION

A robot moves by walking, in particular the robot having a plurality of modules connected to each other and a plurality of legs provided at each module for walking (i.e., a multi-segmented walking robot), are often used to survey site or to inspect malfunctions of various industrial equipment that are inaccessible to operators such as pipes. This kind of robot requires a specific walk control method, as well as a specific walk control system to make the robot move stable, that is, it can move well on uneven surfaces such as rough, inclined, or stepped surfaces.

The most common problem of this kind of robot is that the walk control method and system control the robot's leg movement not stable enough when the robot encounters uneven terrain, as such the robot cannot stably step on the ground to walk. Further, when the robot walks on the ground with different levels, joints that connect a plurality of modules are not controlled by the suitable control method and system to adjust the position or rotation of the joint to the proper position or rotation. This results in the body of the robot not bending along the terrain curve of the ground. Therefore, there is a need to develop the robot's walk control method and system for more efficient performance.

The following prior arts show examples of the method and system which have been developed to improve a locomotion control method or system of the robot.

The research paper entitled "Bio-Inspired Adaptive Locomotion Control System for Online Adaptation of a Walking Robot on Complex Terrains", IEEE Access, 2020, Vol. 8, Pages 91587-91602 discloses continuous, online, and self-adaptive locomotion control inspired by biological control systems, including neural control and hormone systems. The control approach integrates existing modular neural locomotion control (MNLC) and an artificial hormone mechanism (AHM). While the MNLC can generate various gaits through its modulatory input, the AHM, which replicates the endocrine system, adapts to rapid changes in online walking frequency and gait in response to different complex terrains.

The control system according to the above research paper adapts the robot's locomotion by changing the walking frequency and/or gait pattern. It does not mention about controlling the body joints of the robot and changing the leg joint offset.

The research paper entitled "Online Gait Adaptation of a Hexapod Robot Using an Improved Artificial Hormone Mechanism", 15th International Conference on Simulation of Adaptive Behavior, Germany, 2018, Pages 212-222 discloses a bio-inspired walking robot that is controlled by a combination of multiple central pattern generators (CPG) and an artificial hormone mechanism with multiple receptor stages to achieve online gait adaptation. The control technique aims to provide more dynamics for the artificial hormone mechanism with the inclusion of the hormone-receptor binding effect.

This research paper also does not disclose controlling the body joints of the robot and changing the leg joint offset. Its control system only adapts the robot's locomotion by changing the walking frequency and/or gait pattern.

The research paper entitled "Torque Control Strategies for Snake Robots", 2014 IEEE/RSJ International Conference on Intelligent Robots and Systems, USA, 2014, Pages 1093-1099 discloses three methods of achieving compliant motion with a snake robot by controlling the torques exerted by the joints of the robot. Two strategies command joint torques based solely on the robot's local curvature, i.e., joint angles. The third strategy commands joint angles, velocities, and torques based on the recorded feedback from the robot while executing a previously defined motion under position control. The three control strategies are implemented and compared on a snake robot that includes series elastic actuation (SEA) and torque sensing at each joint and demonstrates compliant locomotion that adapts automatically to the robot's surrounding terrain. This research paper does not require controlling the leg of the robot as its robot's structure has no leg.

Although the above-mentioned three research papers involve controlling the joint angles, velocities, and torques of the robot, they do not disclose a relationship between the joint controlling and the walking of the robot.

SUMMARY OF THE INVENTION

It is therefore an object of the present invention to overcome the above-mentioned disadvantages in the prior arts.

The present invention aims to improve a locomotion control method and system of a walking robot, especially the robot with multi-segmentations such that the robot can adapt its motion, e.g., the position or rotation of body joint motor and legs, to traverse through unpredictable changing environments, such as, uneven terrain or ground with different level.

In one aspect, the present invention relates to a method for controlling motion of a multi-segmented walking robot, the method comprising the steps of: (A) generating walking pattern signals including BC (body-coxa) motor signals, CF (coxa-femur) motor signals and FT (femur-tibia) motor signals using a central pattern generator (CPG); (B) sending the generated walking pattern signals to a controller to generate motor commands to drive a plurality of joint motors of each leg of robot including BC joint motors, CF joint motors, and FT joint motors based on the generated motor commands; (C) detecting motion feedback signals using a plurality of sensors comprising a plurality of foot contact sensors installed at each foot and a plurality of torque sensors installed at each body joint motor; (D) processing the detected motion feedback signals of each foot and each body joint motor to recognize the motion of robot; and (E) adapting the motion of robot, by a controller, based on the recognized motion of robot. According to this invention, the step (D) processing the detected motion feedback signals of each foot and each body joint motor comprises the steps of: (D1) processing the detected motion feedback signals of the foot contact sensor to obtain a CF and FT joint motor offset of each leg of the robot, and (D2) processing the detected motion feedback signals of the torque sensor to obtain a torque offset of each body joint motor of the robot. And, the step (E) adapting the motion of robot comprises the steps of: (E1) adjusting the generated motor commands based on the CF and FT joint motor offset such that a plurality of joint motors is controlled to cause the legs of the robot to change the lifting height, the stepping frequency and/or the stepping phase, and (E2) generating the motor commands based on the torque offset such that each body joint motor of robot is controlled to minimize the torque offset.

Another aspect of the present invention relates to a system for controlling motion of a multi-segmented walking robot, the system comprising: a central pattern generator (CPG) provided for generating walking pattern signals including BC motor signals, CF motor signals, and FT motor signals; a controller provided for receiving the walking pattern signals generated from CPG, and generating motor commands to drive a plurality of joint motors of each leg of robot including BC joint motors, CF joint motors, and FT joint motors of the robot; a plurality of sensors provided for detecting motion feedback signals, the plurality of sensors comprising a plurality of foot contact sensors installed at each foot of the robot and a plurality of torque sensors installed at each body joint motor; an artificial hormone system processing unit provided for processing the detected motion feedback signals derived from the foot contact sensor to obtain a CF and FT joint motor offset of each leg of the robot to recognize the motion of robot; and a torque processing unit provided for processing the detected motion feedback signals derived from the torque sensor to obtain a torque offset of each body joint motor of the robot. The controller is performed to adapt the motion of robot comprising adjusting the generated motor commands based on the CF and FT joint motor offset such that a plurality of joint motors is controlled to cause a plurality of legs of the robot to change the lifting height, the stepping frequency and/or the stepping phase, and generating the motor commands based on the torque offset such that each body joint motor of robot is controlled to minimize the torque offset.

DETAILED DESCRIPTION OF THE INVENTION

The present invention relates to a method and system for controlling motion of a multi-segmented walking robot which will be described by the following details with reference to the accompanying figures.

Any aspects represented herein shall mean to include the application with other aspects of this invention unless it has been specified otherwise.

All technical terms used herein have the meaning that will be understood by those ordinary skilled in the art unless it has been defined otherwise.

Use of singular nouns or pronouns when used with "comprising" in claims and/or specification means "one" and will also include "one or more", "at least one", and "one or more than one".

The terms "comprise", "has/have" and "include" are open-ended verbs, wherein one or more of these verb formats, for example "comprise", "comprising", "has/have", "having", "include", "including" are also open-ended verbs. For example, any method that "comprises", "has" or "includes" one step or more does not limit to one step or steps but also covers the steps that has not been indicated.

Any instrument, equipment or method mentioned herein, unless indicated otherwise, shall mean instrument, equipment or that are generally used or practiced by a person skilled in the art of this field.

Figure 1:
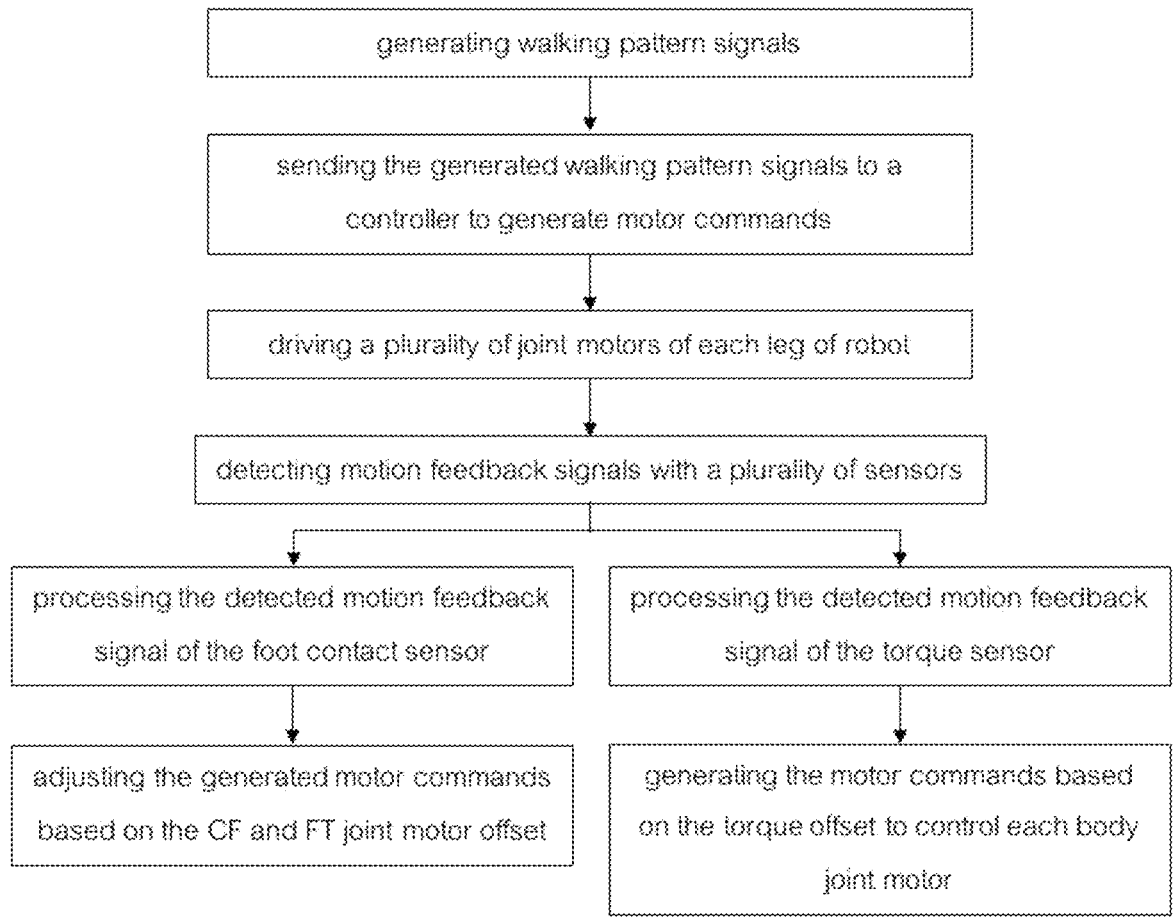
FIG. 1 is a flowchart showing the steps of the method for controlling motion of the multi-segmented walking robot according to the present invention.

Referring now to FIG. 1, the first aspect of the present invention relates to a method for controlling motion of a multi-segmented walking robot, for example a hexapod robot. The method comprises the steps of:

(A) generating walking pattern signals including BC (body-coxa) motor signals, CF coxa) motor signals, CF (coxa-femur) motor signals and FT (femur-tibia) motor signals using a central pattern generator (CPG);

(B) sending the generated walking pattern signals to a controller to generate motor commands to drive a plurality of joint motors of each leg of robot including BC joint motors, CF joint motors and FT joint motors based on the generated motor commands;

(C) detecting motion feedback signals using a plurality of sensors comprising a plurality of foot contact sensors installed at each foot and a plurality of torque sensors installed at each body joint motor;

(D) processing the detected motion feedback signals of each foot and each body joint motor to recognize the motion of robot; and (E) adapting the motion of robot, by a controller, based on the recognized motion of robot.

According to the present invention, the step (D) processing the detected motion feedback signals of each foot and each body joint motor comprises the steps of:

(D1) processing the detected motion feedback signals of the foot contact sensor to obtain a CF and FT joint motor offset of each leg of the robot; and (D2) processing the detected motion feedback signals of the torque sensor to obtain a torque offset of each body joint motor of the robot.

And, the step (E) adapting the motion of robot comprises the steps of:

(E1) adjusting the generated motor commands based on the CF and FT joint motor offset such that a plurality of joint motors is controlled to cause the legs of the robot to change the lifting height, the stepping frequency and/or the stepping phase; and (E2) generating the motor commands based on the torque offset such that each body joint motor of robot is controlled to minimize the torque offset.

According to the above embodiment, the CPG is used to generate the insect-like gait for the basic locomotion pattern of the robot.

For this invention, the step (E1) adjusting the generated motor commands based on the CF and FT joint motor offset enables the walking of the robot to be stable. That is, although the robot walks on uneven areas, the stride of the legs remains stable with the compatibility of the CF and FT joint motor. Further, the step (E2) generating the motor commands based on the torque offset allows the body joint motor of the robot to be controlled to rotate upwardly or downwardly. As a result, the overall shape of each module of the multi-segmented robot corresponds to the surface on which the robot is walking. The robot thus can adapt its body to the terrain so that each leg of the robot can walk on the ground more stably.

Figure 2:
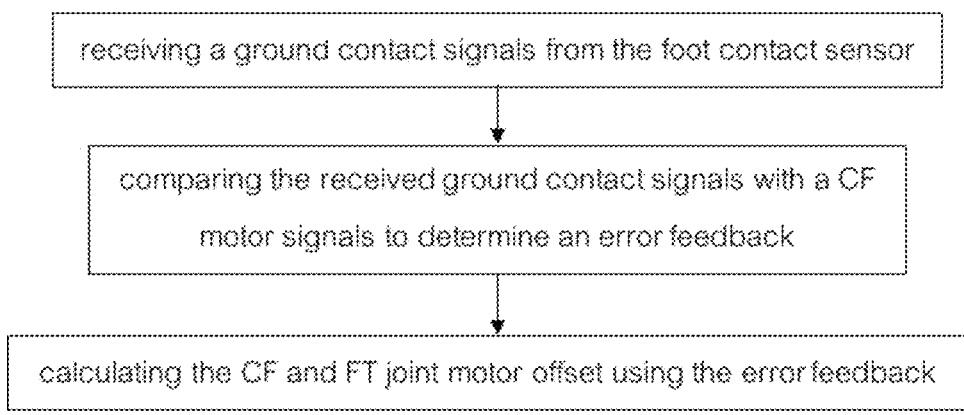
FIG. 2 is a flowchart showing the steps of processing the detected motion feedback signals of the foot contact sensor according to the present invention.

As shown in FIG. 2, the step (D1) processing the detected motion feedback signals of the foot contact sensor comprises receiving a ground contact signals from the foot contact sensors, comparing the received ground contact signals with the CF motor signals to determine an error feedback, and calculating the CF and FT joint motor offset using the error feedback. For this invention, calculating the CF and FT joint motor offset is performed by the artificial hormone system processing unit.

For the above embodiment, the error feedback is sent to the controller to control the CF joint motor and the FT joint motor to cooperate. Thus, the robot can adapt its leg to search for a foothold, i.e., each leg can individually adjust itself according to the roughness of the terrain.

The step (D2) processing the detected motion feedback signals of the torque sensor comprises processing the detected motion feedback signal of the torque sensor of a pitch body joint motor. The arrangement of the pitch body joint motor allows an adjustment of each module of the multi-segmented robot to rotate in the upward-downward direction relative to each other.

Figure 3:
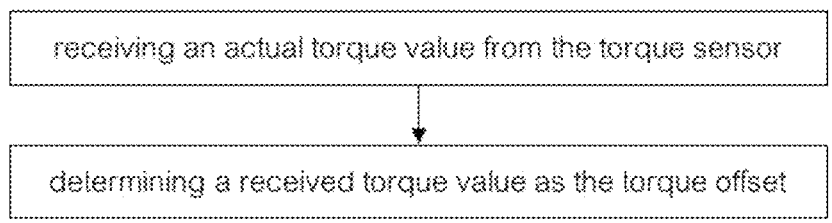
FIG. 3 is a flowchart showing the steps of processing the detected motion feedback signals of the torque sensor according to the present invention.

As shown in FIG. 3, the step (D2) processing the detected motion feedback signal of the torque sensor comprises receiving an actual torque value from the torque sensor and determining a received torque value as the torque offset by a torque processing unit. The torque offset of the body joint motor is sent to the controller to control the body joint motor based on the torque offset, thereby the torque offset of the body joint motor will be minimized.

According to a preferred embodiment, the minimized torque offset of the step (E2) is zero. However, the minimized torque offset is not limited to zero, it can be various values, for −5, −4, −3, −2, −1, 1, 2, 3, 4, or 5. Further, the minimized torque offset can be set as a example, range, such as, −5 to 5.

The step (C) detecting motion feedback signals may further comprise detecting an inertial feedback signal from an inertial measurement unit (IMU) sensor installed at a body of the robot.

According to the above embodiment, detecting an inertial feedback signal is performed to measure the movement of the robot. The detected signal will be sent to the controller to control a plurality of joint motors of each leg for preventing tilting or overturning of the robot. This can cause advantage to body stabilization control.

The step (C) detecting motion feedback signals may further comprise detecting obstacle detecting feedback signals from a plurality of infrared sensors or ultrasonic sensors installed at each foot of the robot. This step is performed to detect the obstacle against the leg of the robot. The detected signal will be sent to the controller to control a plurality of joint motors of each leg for stepping over the obstacle.

In addition, the step (C) detecting motion feedback signals may further comprise detecting motor rotation feedback signals from a plurality of motor rotation sensors installed at each joint motor. This step is performed to obtain the rotation degree or position of each joint motor.

The second aspect of the present invention relates to a system for controlling motion of a multi-segmented walking robot.

Figure 4:
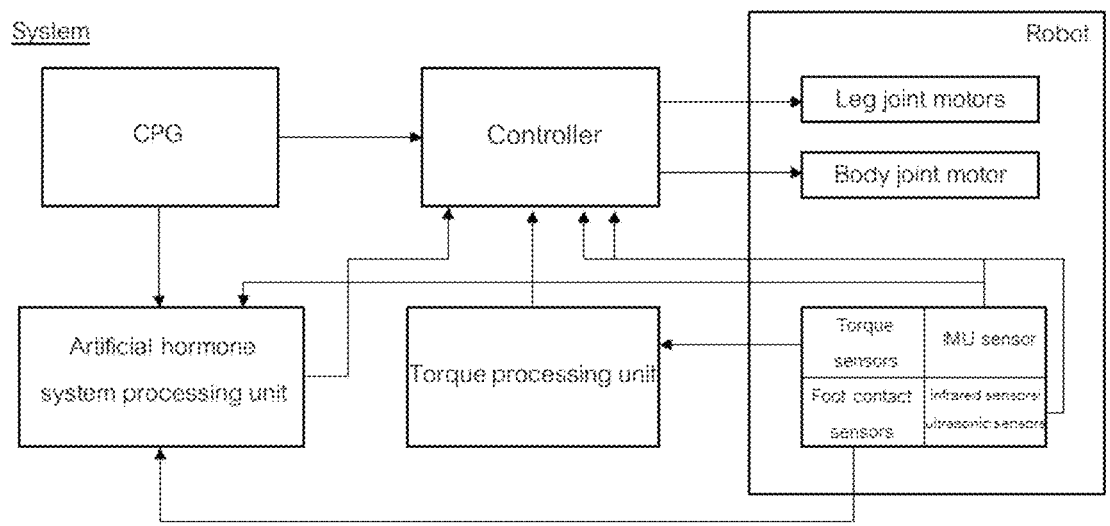
FIG. 4 is a diagram showing a relationship between the components of the system for controlling motion of the multi-segmented walking robot according to the present invention.

Referring to FIG. 4, the system of this invention comprises:
a central pattern generator (CPG) provided for generating walking pattern signals including BC motor signals, CF motor signals, and FT motor signals;
a controller provided for receiving the walking pattern signals generated from CPG, and generating motor commands to drive a plurality of joint motors of each leg of robot including BC joint motors, CF joint motors, and FT joint motors of the robot;
a plurality of sensors provided for detecting motion feedback signals, the plurality of sensors comprising a plurality of foot contact sensor installed at each foot of the robot and a plurality of torque sensor installed at each body joint motor;
an artificial hormone system processing unit provided for processing the detected motion feedback signals derived from the foot contact sensor to obtain a CF and FT joint motor offset of each leg of the robot to recognize the motion of robot; and
a torque processing unit provided for processing the detected motion feedback signals derived from the torque sensor to obtain a torque offset of each body joint motor of the robot.

According to this invention, the controller is performed to adapt the motion of robot comprising adjusting the generated motor commands based on the CF and FT joint motor offset such that a plurality of joint motors is controlled to cause a plurality of legs of the robot to change the lifting height, the stepping frequency and/or the stepping phase, and generating the motor commands based on the torque offset such that each body joint motor of robot is controlled to minimize the torque offset.

The torque processing unit is used to allow the body of the robot to bend itself corresponding to the terrain curve of the ground.

The artificial hormone system processing unit and the torque processing unit both receive different detected motion feedback signals from the sensors (the foot contact sensor and the torque sensors) to create adaptive behavior for the robot enabling it to deal efficiently with uneven surfaces such as rough, inclined, or stepped surfaces.

Similar to that is shown in FIG. 2, the artificial hormone system processing unit is configured to receive ground contact signals from the foot contact sensors, compare the received ground contact signals with the CF motor signals to determine an error feedback, and calculate the CF and FT joint motor offset using the error feedback.

The torque processing unit is configured to process the detected motion feedback signal of the torque sensor of a pitch body joint motor. Further, the torque processing unit is configured to receive an actual torque value from the torque sensor and determine a received torque value as the torque offset.

According to a preferred embodiment, the minimized torque offset as mentioned before in step (E2) is zero. The minimized torque offset is not limited to zero. It can be any other value as mentioned above.

Another preferred embodiment, a plurality of sensors may further comprise an inertial measurement unit sensor installed at a body of the robot for detecting an inertial feedback signal, a plurality of infrared sensors or ultrasonic sensors installed at each foot of the robot for detecting obstacle detecting feedback signals, and a plurality of motor rotation sensors installed at each joint motor for detecting motor rotation feedback signals.

Alternatively, a plurality of sensors may further comprise a current sensor installed at a plurality of joint motors and each body joint motor for detecting the energy consumption thereof.

The method and system according to this invention allow the robot to adapt its joint movement individually to the terrain and stabilize its body. This results in efficient locomotion of the robot in various environments, for example, complex terrains, uneven terrains, random step fields. Therefore, the locomotion control method and system of this invention can increase robot's agility for real-world applications, such as planetary/space exploration and search and rescue, for which autonomous mobile robots with versatile and reliable locomotion and continuous adaptation are in high demand.

The method and system disclosed and claimed in this application are intended to cover aspects of the invention obtained from performing, operating, modifying, changing any factors without experimentations that are significantly different from this invention, and acquire the same which have utilities, advantages, and results similar to the aspects of the present invention according to those ordinary skilled in the art even without being indicated in claims specifically. Therefore, the substitution for or similarity to the aspects of the present invention including minor modification or change that can be apparent to a person skilled in the art in this field shall be considered under the intention, concept, and scope of this invention as appeared in the appended claims.

BEST MODE OF THE INVENTION

Best mode of the invention is as described in the detailed description of the invention.

The invention claimed is:

1. A method for controlling motion of a multi-segmented walking robot, the method comprising:
   (A) generating walking pattern signals including BC (body-coxa) motor signals, CF (coxa-femur) motor signals and FT (femur-tibia) motor signals using a central pattern generator (CPG);
   (B) sending the generated walking pattern signals to a controller to generate motor commands to drive a plurality of joint motors of each leg of robot including BC joint motors, CF joint motors, and FT joint motors based on the generated motor commands;
   (C) detecting motion feedback signals using a plurality of sensors comprising a plurality of foot contact sensors installed at each foot and a plurality of torque sensors installed at each body joint motor;
   (D) processing the detected motion feedback signals of each foot and each body joint motor to recognize the motion of robot; and
   (E) adapting the motion of robot, by a controller, based on the recognized motion of robot;
   wherein (D) processing the detected motion feedback signals of each foot and each body joint motor comprises:
   (D1) processing the detected motion feedback signals of the foot contact sensor to obtain a CF and FT joint motor offset of each leg of the robot, and
   (D2) processing the detected motion feedback signals of the torque sensor to obtain a torque offset of each body joint motor of the robot; and wherein (E) adapting the motion of robot comprises:
   (E1) adjusting the generated motor commands based on the CF and FT joint motor offset such that a plurality of joint motors is controlled to cause the legs of the robot to change at least one of: a lifting height, a stepping frequency or a stepping phase, and
   (E2) generating the motor commands based on the torque offset such that each body joint motor of robot is controlled to minimize the torque offset.

2. The method according to claim 1, wherein (D1) processing the detected motion feedback signals of the foot contact sensor comprises receiving a ground contact signals from the foot contact sensors, comparing the received ground contact signals with the CF motor signals to determine an error feedback, and calculating the CF and FT joint motor offset using the error feedback.

3. The method according to claim 2, wherein calculating the CF and FT joint motor offset is performed by an artificial hormone system processing unit.

4. The method according to claim 1, wherein (D2) processing the detected motion feedback signals of the torque sensor comprises processing the detected motion feedback signal of the torque sensor of a pitch body joint motor.

5. The method according to claim 1, wherein (D2) processing the detected motion feedback signal of the torque sensor comprises receiving an actual torque value from the torque sensor and determining a received torque value as the torque offset by a torque processing unit.

6. The method according to claim 1, wherein the minimized torque offset of (E2) is zero.

7. The method according to claim 1, wherein (C) detecting motion feedback signals further comprises detecting an inertial feedback signal from an inertial measurement unit (IMU) sensor installed at a body of the robot.

8. The method according to claim 1, wherein (C) detecting motion feedback signals further comprises detecting obstacle detecting feedback signals from a plurality of infrared sensors or ultrasonic sensors installed at each foot of the robot.

9. The method according to claim 1, wherein (C) detecting motion feedback signals further comprises detecting motor rotation feedback signals from a plurality of motor rotation sensors installed at each joint motor.

10. A system for controlling motion of a multi-segmented walking robot, the system comprising:
    a central pattern generator (CPG) for generating walking pattern signals including BC (body-coxa) motor signals, CF (coxa-femur) motor signals, and FT (femur-tibia) motor signals;
    a controller for receiving the walking pattern signals generated from CPG, and generating motor commands to drive a plurality of joint motors of each leg of robot including BC joint motors, CF joint motors, and FT joint motors of the robot;
    a plurality of sensors for detecting motion feedback signals, the plurality of sensors comprising a plurality of foot contact sensors installed at each foot of the robot and a plurality of torque sensors installed at each body joint motor;
    an artificial hormone system processing unit for processing the detected motion feedback signals derived from the foot contact sensor to obtain a CF and FT joint motor offset of each leg of the robot to recognize the motion of robot; and
    a torque processing unit for processing the detected motion feedback signals derived from the torque sensor to obtain a torque offset of each body joint motor of the robot, wherein the controller is performed to adapt the motion of robot comprising adjusting the generated motor commands based on the CF and FT joint motor offset such that a plurality of joint motors is controlled to cause a plurality of legs of the robot to change at least one of: a lifting height, a stepping frequency or a stepping phase, and generating the motor commands based on the torque offset such that each body joint motor of robot is controlled to minimize the torque offset.

11. The system according to claim 10, wherein the artificial hormone system processing unit is configured to receive ground contact signals from the foot contact sensors, compare the received ground contact signals with the CF motor signals to determine an error feedback, and calculate the CF and FT joint motor offset using the error feedback.

12. The system according to claim 10, wherein the torque processing unit is configured to process the detected motion feedback signal of the torque sensor of a pitch body joint motor.

13. The system according to claim 10, wherein the torque processing unit is configured to receive an actual torque value from the torque sensor and determine a received torque value as the torque offset.

14. The system according to claim 10, wherein the minimized torque offset is zero.

15. The system according to claim 10, wherein the plurality of sensors further comprises an inertial measurement unit (IMU) sensor installed at a body of the robot for detecting an inertial feedback signal.

16. The system according to claim 10, wherein the plurality of sensors further comprises a plurality of infrared sensors or ultrasonic sensors installed at each foot of the robot for detecting obstacle detecting feedback signals.

17. The system according to claim 10, wherein the plurality of sensors further comprises a plurality of motor rotation sensors installed at each joint motor for detecting motor rotation feedback signals.

* * * * *